July 12, 1960 — N. G. WINTERMANTEL ET AL — 2,944,833
TRICYCLE FRAME

Filed Feb. 1, 1957

INVENTORS
TENNES I. ERSTAD
NORMAN G. WINTERMANTEL
BY
Attorney

July 12, 1960   N. G. WINTERMANTEL ET AL   2,944,833
TRICYCLE FRAME

Filed Feb. 1, 1957   4 Sheets-Sheet 2

INVENTORS
TENNES I. ERSTAD
NORMAN G. WINTERMANTEL
BY
Tennes J. Erstad
Attorney

July 12, 1960 N. G. WINTERMANTEL ET AL 2,944,833
TRICYCLE FRAME
Filed Feb. 1, 1957 4 Sheets-Sheet 3
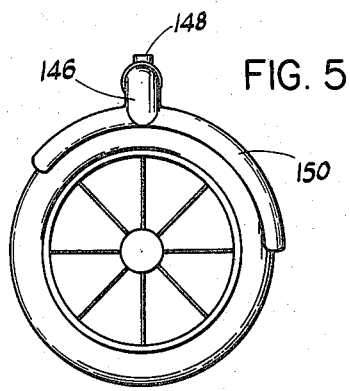
FIG. 5
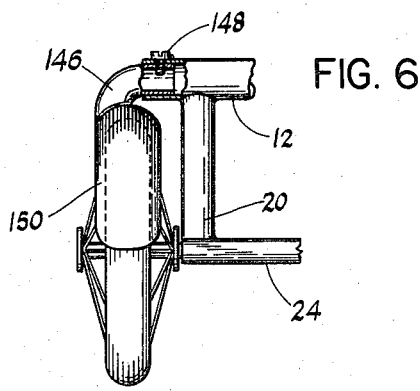
FIG. 6
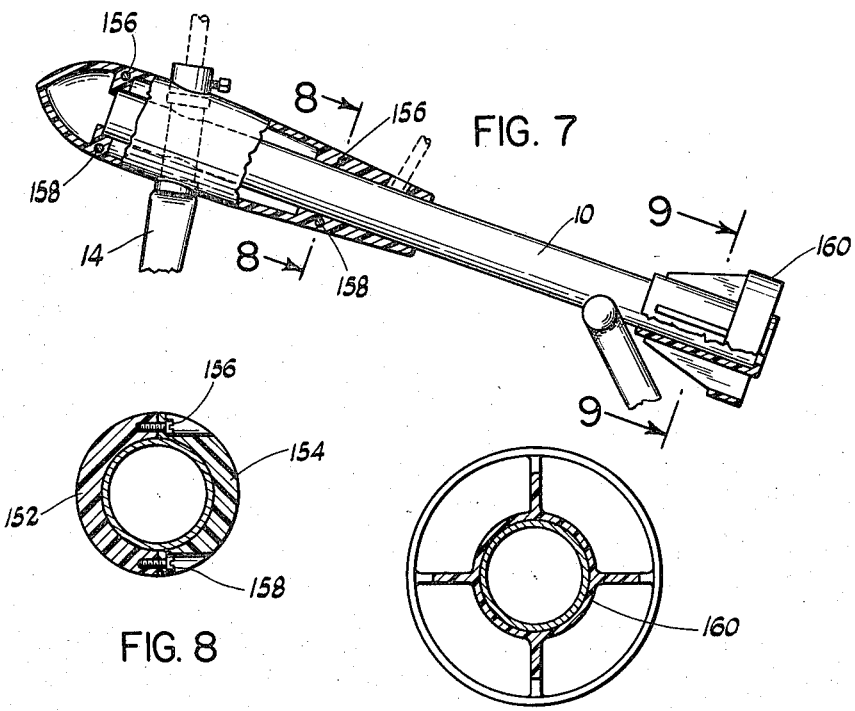
FIG. 7
FIG. 8
FIG. 9
INVENTORS
TENNES I. ERSTAD
NORMAN G. WINTERMANTEL
BY
Attorney July 12, 1960 — N. G. WINTERMANTEL ET AL — 2,944,833

TRICYCLE FRAME

Filed Feb. 1, 1957 — 4 Sheets-Sheet 4

INVENTORS
TENNES I. ERSTAD
NORMAN G. WINTERMANTEL
BY
Attorney

United States Patent Office 2,944,833
Patented July 12, 1960

2,944,833
TRICYCLE FRAME

Norman G. Wintermantel, Palos Heights, Ill., and Tennes I. Erstad, Brooklyn, N.Y., assignors to American Machine and Foundry Company, a corporation of New Jersey Filed Feb. 1, 1957, Ser. No. 637,660

13 Claims. (Cl. 280—282)

This invention relates to children's wheel goods including tricycles and the construction thereof.

There have been many types of tricycle frames designed for use with wheel goods, such as children's tricycles. These designs have been of such a construction that they had one basic appearance that could not be readily changed without changing the tricycle frame itself and had certain structural features which were weak.

It is the purpose of this invention to provide a tricycle framework of a sturdy design which is adaptable to be made into a various number of designs without changing the basic structure of the framework. For example, the bicycle frame disclosed herein is very versatile and lends itself to having attached thereto various types of ornamental designs such as rocket configurations and lighting systems simulating those employed on airplanes.

It is therefore an object of this invention to provide a tricycle frame which can have various accessories readily attached thereto without changing the basic structure of the tricycle design.

A further object is to provide a cycle frame wherein a smaller diameter tube is inserted through the cross bar to provide a head post in which the front wheel of a cycle is pivoted.

Another object is to provide an improved method of constructing cycle frames.

Another object of this invention is to provide openings in the tricycle frame into which can be fitted lights or ornaments without changing the structural arrangement of the frame.

Another object is to provide a framework to which accessories can be attached in a way so that they blend therewith in appearance.

A further object is to provide a lighting system wherein there will be an alternate flashing of lights similar to that seen on airplanes.

Another object is to provide a lighting pattern which may be readily changed by a child using the tricycle.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 5 is a further embodiment of my invention showing a mudguard mounted in the "U-bone" of the tricycle frame shown in Figs. 1 and 2.

Fig. 6 is a partial rear end view of the modified form of the invention shown in Fig. 5.

Fig. 7 is a side view of my tricycle cross bar having a rocket ornament mounted thereon.

Fig. 8 is a cross-sectional end view taken on line 8—8 of Fig. 7.

Fig. 9 is a cross sectional end view taken on line 9—9 of Fig. 7.

Figure 1:
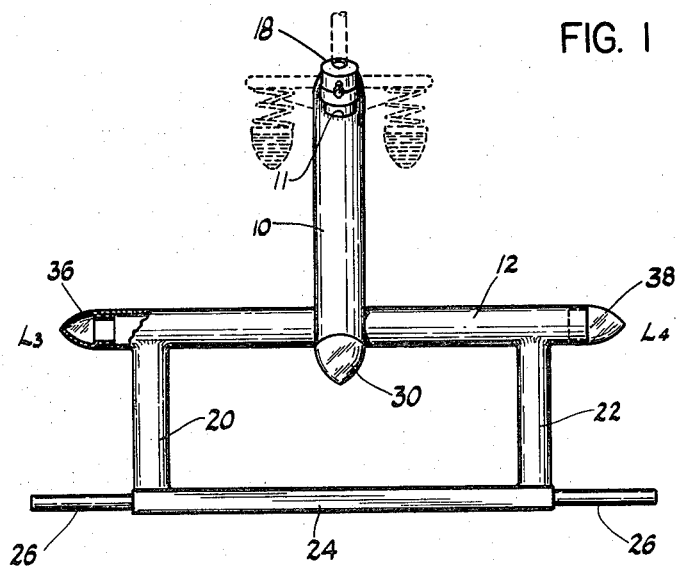
Fig. 1 is an end view of the cycle.

The improved cycle frame which is shown in the drawings has many advantages over the conventional frames heretofore employed in the cycle art. The frame that has been shown is for a tricycle and consists of an inclined straight tubular cross bar 10 having a transverse tubular bar 12 secured to the underside of its lower end. The forward or upper end of the inclined cross bar 10 has a hole 11 punched therein in which is mounted a short length of smaller diameter tubing 9 which forms a head post.

The tubing 9 fits snugly in the hole 11 and may be tack welded at points 15 and 17 or preferably may be brazed or welded through the front end of the cross bar 10 on the inside to join the tubing 9 to the cross bar 10. The stem (not shown) of the fork 14 extends through the tubing 9. Suitable flanged collars 16 and 19 may be placed around the fork stem to cover the ends of tubing 9 and act as bearings for the front fork 14. A retaining collar 18 secures the stem of front fork 14 in the transverse tubing 9 mounted in the cross bar 10. For purposes of simplicity the usual handle bar and wheels of the tricycle have been dispensed with in the drawings since these are well known in the art.

By supporting the head post on all sides in the cross bar, it becomes a strong integral part of the cross bar 10 and is stronger than the former method employed of butt-welding the end of the cross bar to the head post. Also because of the firm lateral support the head post receives in passing through a hole in the cross bar, less welding is required to hold it in place than was formerly necessary.

Similarly, it has been found that the method of piercing a cross bar intermediate its ends and inserting and mounting a length of smaller diameter tubing therein, not only forms a stronger frame but it is more simple and economical to construct a framework of this design in this manner.

The transverse bar 12 has a pair of descending legs 20 and 22 extending downwardly therefrom and are connected to a step plate 24 which supports a transverse axle 26.

Figure 2:
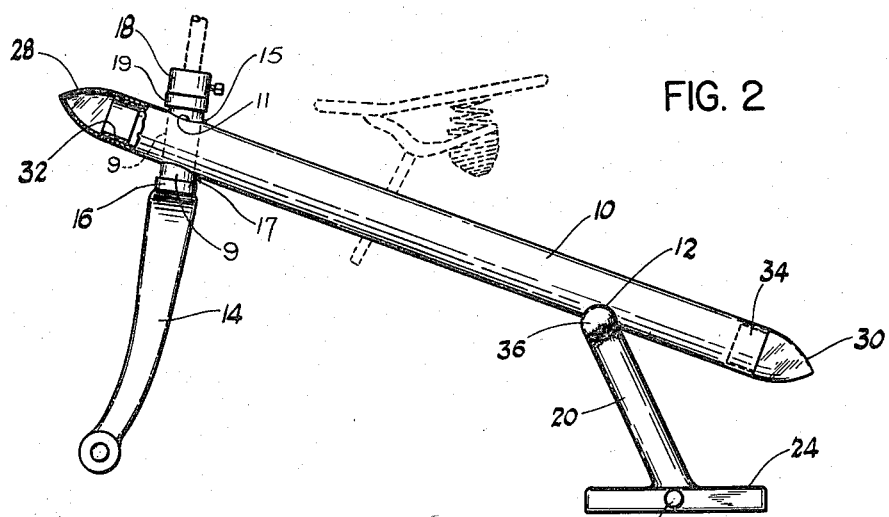
Fig. 2 is a side view of the cycle frame shown in Fig. 1.

The cross bar 10 is open at the ends to permit accessories to be readily secured in these openings. For example, in Fig. 2, it is shown how bullet-shaped plugs 28 and 30 may be inserted into these openings and retained in position either by a press fit or by piercing two holes (not shown) in the cross bar 10 and using two self tapping screws (not shown). The plugs may be made of colored translucent or transparent material, such as plastic, so as to form light globes, or they may be opaque and form a bull nose termination of the cycle frame. In Fig. 1, I have shown how similar plugs 36 and 38 may be inserted into the ends of the transverse bar 12.

When the plugs or globes 28, 30, 36 and 38 are made of translucent material, it is possible to place luminescent means or bulbs inside the globe so that they will simulate the lights of a vehicle, boat or plane. Similarly, when translucent plugs are employed of the same color as the color the particular model of the tricycle on which they are used, the coloring is emphasized by the shining globe in a manner not possible heretofore.

Figure 3:
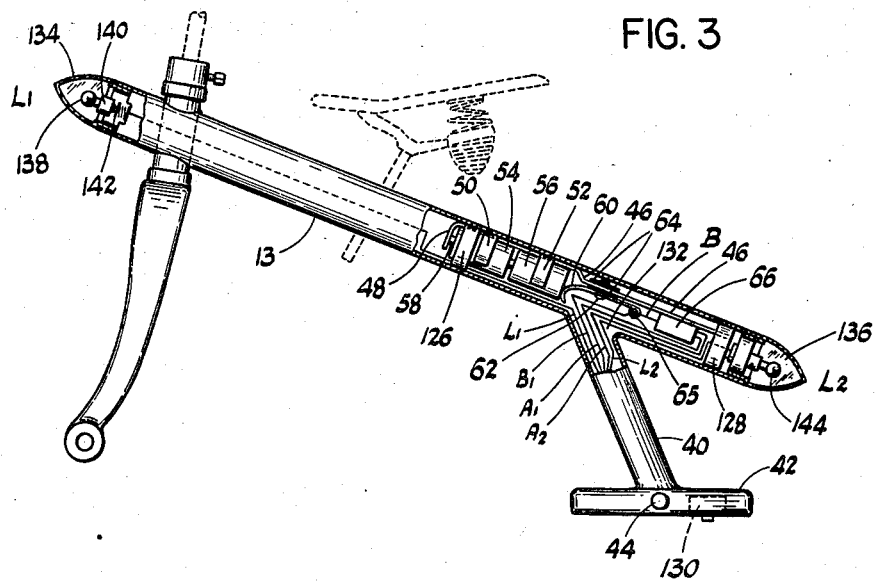
Fig. 3 is a modified form of a tricycle frame.
Figure 4:
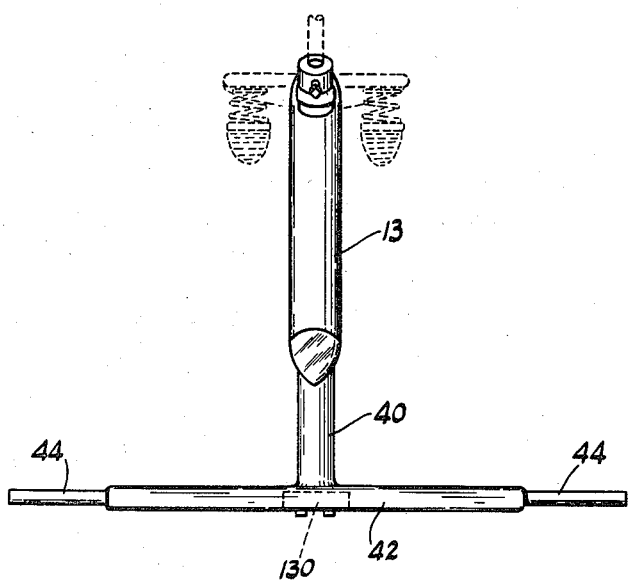
Fig. 4 is a rear end view of the tricycle frame shown in Fig. 3.

Figs. 3 and 4 show a further embodiment of the tricycle frame. In this embodiment, instead of having a "U-bone," the rear end of the frame has only a single, downwardly extending leg 40 which is connected to the center of the step plate 42, which in turn supports a rear axle 44.

In the embodiment shown in Fig. 3, there is also shown in addition to the improved head post mounting and frame design described above, a unique lighting arrangement incorporated with the tricycle frame. This lighting structure does not require any physical modification to be made in the frame to receive the lighting pack inside the cross tube to greatly enhance the utility and versatility of the tricycle for a child.

The lighting power and control pack consists of a supporting framework 46 having a flange 48 formed at one end. Suitable spring battery holding clamps 50 and 52 are welded to the supporting frame 46 and grip flashlight batteries 54 and 56 around opposite sides.

The batteries 54 and 56 are snapped into position between the clamps 50 and 52 by pushing them in until they are squeezed between the arms 50 and 52 and the supporting frame 46 as shown in Fig. 3.

The contact cap 58 of the battery is held against the flange 48 by means of a bottom spring clip 60 which is fixedly connected to the framework 46 by a suitable rivet 62 and is electrically insulated from the framework 46 by insulating bushings 64. The other end of the spring 60 has a conventional battery type wire clip terminal 65 to which is connected wires B and B1.

An alternating blinker 66 is secured to the supporting frame 46 by suitable means (not shown). The battery terminal clip 65 is connected to the alternating blinker by wire B.

Figure 10:
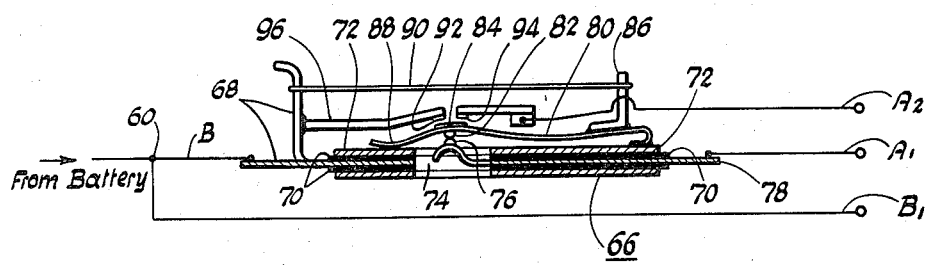
Fig. 10 is a detailed side elevation of an alternating blinker shown in Fig. 3.

The alternating blinker may be of any suitable design and could follow the principles of operation shown and described in U.S. Patent 2,388,712, granted to J. Schmidinger on November 13, 1945. The structure disclosed herein is a modification of the structure shown in said patent so as to achive an alternating blinking operation of the lighting system. The principle of operation is clearly indicated in Fig. 10, wherein wire B is connected to an upwardly extending lug 68, the lower end of which has insulation 70 wrapped around the same which in turn has an outer metallic supporting plate 72 firmly holding the lower end of lug 68. A hole 74 is formed through the insulation 70 and the plate 72. A contact 76 extends through the hole 74 and constitutes an extension of the plate 78. The plate 78 is surrounded by insulation 70 and is firmly supported by the supporting plate 72.

A spring vane 80 having the configuration described in U.S. Patent 2,388,712 is secured at one end to the top of the supporting plate 72 and has mounted on the underside thereof an electrical contact 82 and and electrical contact 84 on the upper side thereof. An angle bracket 86 is mounted on the vane 80, while the opposite end 88 of vane 80 freely rests on top of the supporting plate 72.

An expandable wire 90 is connected at one end to the lug 68 and at the other end to the lug 86. Sufficient tension is applied to wire 90 to bend the vane 80 to bring contact 82 into contact with member 76. When current is applied to wire B, this will cause the electricity to flow through the wire 90, bracket 86, vane 80, contacts 82 and 76 which are in contact with each other, member 78 out through wire A1.

The flow of current through wire 90 causes the wire to heat up, thereby causing the contact 82 to disengage from contact 76, thereby interrupting the flow of electrical current through wire 90. This movement of the vane 80 also brings contact 84 into engagement with contacts 92 and 94. Then, electrical current flows through the supporting arm 96, contacts 92, 84 and 94 out through wire A2.

Since the wire or arm 96 is of a much larger gauge than expanding wire 90, electrical current will flow completely through wire 96 and none, or a negligible amount, would flow through wire 90, thus allowing wire 90 to cool.

During the time electrical current flows through wire or arm 96 out through contacts 92, 84 and 94, the circuit connected with A2 will be energized. When the wire 90 cools, it contracts, pulling the bracket 86 towards contact 76. This causes the vane 80 to move contact 82 into engagement with contact 76, thereby causing current to flow through wire 90, lug 86, vane 80, contact 82, 76, out through the circuit connected to A1 which continues until the wire 90 again heats up, when again the cycle described is repeated. We thus have a flow of current alternately through wire A1 and then wire A2.

Figure 11:
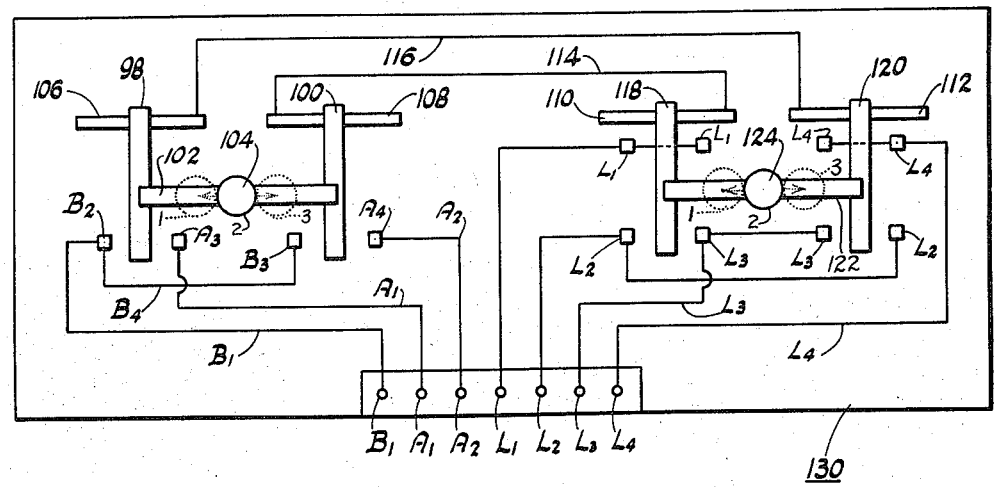
Fig. 11 is a plan view of the switch shown in Fig. 3.

Wires A1, A2 and B1 are connected to a multiple pole switch 130 shown in Fig. 11. The contact arms 98, 100 of the multiple pole switch 130 are interconnected by an insulated bar 102 having a slide button 104 permitting the contact bars 98 and 100 to be moved in unison, depending upon the direction the button is pushed. The slide button switch 104 has three positions.

Position 1 of knob 104 (shown in dotted outline) brings the contact plates 98 and 100 into contact with contacts B2 and B3. Contacts B2 and B3 are interconnected with each other by wire B4. Middle position 2 of knob 104 (shown in full lines) is a neutral position where switch contact 98 and 100 are not in contact with any conducting contacts. In position 3 (shown in dotted outline) where the contacts 98 and 100 have been moved to their extreme right, they are brought into contact with contacts A3 and A4 respectively.

The other end of contacts 98 and 100 slide on plates 106 and 108. The plates 106 and 108 are connected with plates 110 and 112 respectively by wires 114 and 116.

The contacting plates 110 and 112 constitute a second multiple pole switch. The sliding contact bars 118 and 120 are interconnected by an insulated non-conducting bar 122 having a button 124 fixedly secured thereto. This button 124 has three positions. When the button 124 is moved to the extreme left (position 1 shown in dotted outline), it moves the contact bars 118 and 120 by means of insulating bar 122 into engagement with contacts L1, L2, L4 and L3. When the contact bars 118 and 120 by means of button 124 are pushed to the extreme right (position 3 shown in dotted outline), the bars are brought into engagement with contacts L1, L3, L4 and L2 respectively. The central position of button 124 is a neutral position where no contacts are engaged.

Referring to Fig. 3, the supporting frame 46 has affixed thereto spring tensioned bands 126 and 128. When the supporting frame 46 together with the batteries and the alternating blinker unit is inserted inside the inclined tube 13, the bands 126 and 128 firmly hold the unit in place.

The switchbox 130 may be mounted in any suitable place on the tricycle. As for example, on the underside of the inclined tube 13, in back of the tricycle seat, on the single stem 40 or on the underside of the step plate 52 (as shown). If the switchbox 130 is mounted on the underside of the step plate 42, a suitable hole 132 may be formed in the inclined tube 13 through which the wires referred to in Fig. 11 are connected to their respective contacts shown in Fig. 11.

In the embodiment shown in Fig. 3, a transparent color globe insert 134 is inserted at the lead end of tube 13 while another transparent color globe insert 136 is inserted into the tail end of the inclined tube. A conventional low voltage bulb 138 is screwed into a grounded receptacle 140 and a spring actuated positive contact 142 engages with the tip end of the bulb so as to allow current to flow through the positive contact out through the grounded threaded portion of the bulb. A similar mounting is provided for the bulb 144 at the tail end of the inclined tube 13. Similar bulbs and mountings, therefore, may be placed in translucent plugs inserted at the ends of the transverse cross bar 12 shown in Fig. 1.

The forward light on the tricycle may be of a white color, while the tail light may be of an amber color. Likewise, the bulb on the left side of the tricycle may be red, while that on the right side of the transverse cross bar 12 may be green. We have thus successfully incorporated a lighting arrangement on a tricycle which bears some resemblance to the lighting structure on the bow and stern, port and starboard sides of a ship and the nose, tail and wingtip lights of an airplane, all of which add materially to the enjoyment a child obtains from using his tricycle.

All of these lights are operated from the power control pack supported in the bracket 46 described above. It is obvious that instead of using two flashlight batteries 54 and 56, three or more flashlight batteries could be mounted inside the inclined bar to provide more power, although it has been found for normal usages two flashlight batteries 54 and 56 are usually adequate.

The manner in which the lighting structure operates will now be briefly described. For purposes of illustration, the forward light 138 has been designated as being L1 and the rear light 144 as being L2, the light on the left side as being L3 and the light on the right side as being L4.

To facilitate understanding the connections that are made to the switch contacts shown in Fig. 11, the contacts have been designated with the light members to which they are connected. It will be understood that regardless of whether the switchbox 130 is placed under the step plate 42 or on the back of the tricycle seat or elsewhere, the wires leading to the respective contacts connect with the bulbs to which reference has been made. Preferably, these wires are all mounted inside the tubular framework of the tricycle. The particular framework arrangement disclosed herein enables the wires to be placed therein in such manner so that there need be no external wiring visible which can become damaged in usage.

When the switch button 104 is pushed to the left, the alternating blinker circuit is bypassed, and current flows directly from the batteries through wire B1 into contacts B2 and B3. From these contacts B2 and B3, the current flows respectively through slide strips 98 and 100 into the contactor strips 106 and 108, through wires 116 and 114 into the contact strips 110 and 112. In this position, all the lights on the tricycle, L1 to L4 inclusive, will light up regardless of whether the button 124 is pushed to the left or to the right.

When the switch button 104 is pushed to the right, current will then flow through the alternating blinker 66 shown in Fig. 3 and will pass out alternately through wire A1 and A2 leading to contacts A3 and A4. From contacts A3 and A4, electrical current will flow alternately through the switch bars 98 and 100 into strips 106 and 108, through wires 116 and 114, into strips 112 and 110 respectively. In this case, if the push button 124 is pushed to the extreme left, current will flow through lights L1 and L2, through sliding contact strip 118 from wire A2, while lights L3 and L4 will receive current through sliding contact strip 120 from wire A1 through contact A3 and strip 98. It will thus be apparent that current will flow alternately through wire A1 and then through wire A2 repeatedly, thus first lighting lights L1 and L2 and thereafter lighting lights L3 and L4.

When push button 104 and 124 are both pushed to the extreme right, current will then flow to lights L1 and L3 through wire A2 and current will flow to lights L2 and L4 through wire A1. Since current flows alternately through wires A1 and A2, lights L1 and L3 will blink alternately with lights L2 and L4, while in the reverse position of switch 124, lights L1 and L2 would blink alternately with lights L3 and L4. When either button 104 or 124 is in central or neutral position, all of the lights will be out.

The embodiment shown in Figs. 5 and 6 shows another modified form of the invention wherein a mudguard may be readily secured to the transverse bar 12. To illustrate this feature of the invention, an arm 146 has been shown which fits into the space occupied by the plugs 36 and 38 of Fig. 1 and may be held in place if desired by a suitable screw 148. A conventional mudguard 150 is secured to the arm 146 and is supported thereby. The frame construction that has been disclosed may be readily used with a wide variety of accessories, of which a few very novel and original devices have been shown. This structural design permits a wide line of differently priced tricycles to be manufactured using the same basic frame for all models without the need of redesigning the framework for new lines.

In Figs. 7, 8, and 9, a still further embodiment of the invention is shown wherein there is disclosed the head piece and tail piece of a rocket or guided missile configuration. Here again is an attachment to the basic cycle frame which makes the cycle appear different, and, nevertheless, still embodies all the versatile features heretofore described. The head piece attached to the upper end of the inclined cross bar may be made in two half shells 152 and 154 which are joined together or clamped around the cross bar 10 by suitable screws 156 and 158 which may be countersunk as shown. The tail piece 160 may be a squeeze fit, or, if desired, it may be made in two half shell sections in the same manner as the head piece shown in Fig. 8.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. A framework for a tricycle wherein a back bone cross bar is provided with open ends to receive accessories, means for inserting a head post vertically through said back bone cross bar intermediate the ends of said back bone cross bar so that one end of the cross bar projects in front of said front fork, a rear axle support having a plurality of open ends to receive accessories, said support being connected to said back bone cross bar intermediate the ends of said back bone cross bar so that the rear end of said back bone cross bar projects beyond the connection to the rear axle.

2. A framework for a tricycle having the features provided for in claim 1 wherein a rocket head and tail piece are mounted on the ends of said back bone cross bar.

3. A tricycle frame comprising a straight, hollow, substantially uniform, inclined backbone cross bar having both ends open, handle bars mounted at the upper end of said cross bar, means depending from the lower end of said cross bar, wheels connected to said depending means and tricycle accessory equipment mounted on said hollow cross bar and protruding from each of said open ends.

4. A tricycle frame as claimed in claim 3, wherein said accessory equipment comprises lights mounted in each of said open ends, and a power source for said lights mounted within said hollow backbone cross bar.

5. A tricycle frame as claimed in claim 4, wherein blinking means are mounted within said hollow cross bar to blink said lights.

6. A tricycle frame as claimed in claim 4, wherein said lights include knobs having an outer configuration which extends the planar surface of said backbone cross bar.

7. A tricycle frame comprising a straight, hollow, substantially uniform, inclined backbone cross bar having both ends open, a straight, hollow, substantially uniform, transverse bar having open ends mounted on said cross bar, wheels and handle bars mounted on said frame, and tricycle accessory equipment mounted within said hollow cross bar and hollow transverse bar and protruding from the open ends of each of said bars.

8. A tricycle frame as claimed in claim 7, wherein said accessory equipment comprises lights mounted in the open ends of each of said bars and a power source for said lights mounted within said hollow backbone cross bar.

9. A tricycle frame as claimed in claim 8, wherein blinking means are mounted within said hollow cross bar, for blinking said lights.

10. A tricycle frame as claimed in claim 8, wherein said hollow cross bar and said hollow transverse bar are in communication with each other and wherein the electric leads from the power source to the lights are completely within said hollow bars.

11. A tricycle frame as claimed in claim 10, wherein a switch box is mounted within said frame to control the supply of power to said lights.

12. A tricycle frame as claimed in claim 7, wherein said accessory equipment comprises a mudguard inserted within each open end in said hollow transverse bar.

13. A tricycle frame comprising a straight hollow, substantially uniform, inclined backbone cross-member having both ends open, a straight, hollow, substantially uniform transverse bar having both ends open and mounted on said cross bar at a point spaced from the rear end thereof, a head post extending through said cross bar at a point located inwardly from the front end thereof, a front fork pivotally mounted in said head post, lights mounted within the open ends of said cross bar and transverse bar, a power source located within said cross bar to supply power to the lights, said cross bar and said transverse bar being in communication with each other so that the electric leads from the power source to the lights are completely within said hollow bars, and a switch box within said frame to control said lights.

References Cited in the file of this patent

UNITED STATES PATENTS

| | | |
|---|---|---|
| D. 178,978 | Wintermantel | Oct. 16, 1956 |
| D. 178,979 | Wintermantel | Oct. 16, 1956 |
| D. 183,336 | Wintermantel | Aug. 5, 1958 |
| 1,683,872 | Davis | Sept. 11, 1928 |
| 1,984,916 | Bullock | Dec. 18, 1934 |
| 1,995,529 | Anderson | Mar. 26, 1935 |
| 2,202,479 | Bullock | May 28, 1940 |
| 2,311,941 | Gustafson | Feb. 23, 1943 |
| 2,388,712 | Schmidinger | Nov. 13, 1945 |
| 2,469,944 | Bauters | May 10, 1949 |
| 2,516,705 | Kraeft et al. | July 25, 1950 |
| 2,603,701 | Schadel | July 15, 1952 |
| 2,661,406 | Callan | Dec. 1, 1953 |
| 2,737,554 | Tiffany | Mar. 6, 1956 |

OTHER REFERENCES

Hedstrom Publication of June 1956 by Hedstrom Union Co.